United States Patent
Gebregergis et al.

(10) Patent No.: US 9,461,574 B2
(45) Date of Patent: Oct. 4, 2016

(54) MOTOR CONTROL SYSTEM FOR DETERMINING A REFERENCE D-AXIS CURRENT AND A Q-AXIS CURRENT

(71) Applicants: Abraham Gebregergis, Saginaw, MI (US); Ramakrishnan RajaVenkitasubramony, Saginaw, MI (US); Tomy Sebastian, Saginaw, MI (US); Siddharth Ballal, Saginaw, MI (US)

(72) Inventors: Abraham Gebregergis, Saginaw, MI (US); Ramakrishnan RajaVenkitasubramony, Saginaw, MI (US); Tomy Sebastian, Saginaw, MI (US); Siddharth Ballal, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 62 days.

(21) Appl. No.: 13/795,261

(22) Filed: Mar. 12, 2013

(65) Prior Publication Data
US 2014/0265951 A1    Sep. 18, 2014

(51) Int. Cl.
H02P 21/00    (2006.01)

(52) U.S. Cl.
CPC ............ *H02P 21/0035* (2013.01); *H02P 21/22* (2016.02)

(58) Field of Classification Search
USPC ......... 318/400.02, 599, 552, 400.07, 400.15, 318/431, 400.01, 400.03
See application file for complete search history.

(56) References Cited

U.S. PATENT DOCUMENTS

| 8,018,185 | B2 | 9/2011 | Yamamoto et al. |
| 8,154,228 | B2 | 4/2012 | Yundt et al. |
| 8,744,794 | B2 | 6/2014 | Wu et al. |
| 2005/0057208 | A1 | 3/2005 | Seibel et al. |
| 2006/0132074 | A1 | 6/2006 | Yang et al. |

(Continued)

FOREIGN PATENT DOCUMENTS

| CN | 1138234 | 12/1996 |
| CN | 1754305 | 3/2006 |

(Continued)

OTHER PUBLICATIONS

European Search Report issued Mar. 5, 2015 in corresponding EP Application No. 14158557.0.

(Continued)

*Primary Examiner* — Eduardo Colon Santana
*Assistant Examiner* — Iftekhar Mustafa
(74) *Attorney, Agent, or Firm* — Cantor Colburn LLP

(57) ABSTRACT

A motor control system for determining a reference d-axis current and a reference q-axis current is provided. The motor control system includes a motor, a DC power source and DC input lines, and a current command controller. The DC power source generates a bridge voltage across the DC input lines. The current command controller is configured to monitor the bridge voltage and a torque reference command. The current command controller is configured to calculate the reference q-axis current based on a torque reference command. The current command controller is configured to calculate the reference d-axis current based on a magnitude of the reference q-axis current.

20 Claims, 2 Drawing Sheets

(56) References Cited

U.S. PATENT DOCUMENTS

| | | |
|---|---|---|
| 2007/0205743 A1* | 9/2007 | Takahashi et al. ............ 318/807 |
| 2009/0059446 A1* | 3/2009 | Matsui et al. .................. 361/31 |
| 2009/0295316 A1 | 12/2009 | Patel et al. |
| 2010/0219780 A1 | 9/2010 | Morimoto et al. |
| 2010/0264860 A1 | 10/2010 | Jun et al. |
| 2011/0043149 A1* | 2/2011 | Kitanaka .................. 318/400.26 |
| 2011/0148335 A1* | 6/2011 | Harakawa et al. ...... 318/400.02 |
| 2011/0175558 A1* | 7/2011 | Kitanaka .................... 318/400.3 |
| 2011/0241578 A1* | 10/2011 | Kim ........................ H02P 21/14 318/400.02 |
| 2012/0221280 A1 | 8/2012 | Wu et al. |
| 2014/0253000 A1 | 9/2014 | Gebregergis et al. |
| 2014/0265953 A1 | 9/2014 | Collier-Hallman |

FOREIGN PATENT DOCUMENTS

| | | |
|---|---|---|
| CN | 101479925 | 7/2009 |
| CN | 101507101 | 8/2009 |
| CN | 101902185 | 12/2010 |
| CN | 102545766 | 7/2012 |
| CN | 102594250 | 7/2012 |
| CN | 102694498 | 9/2012 |
| EP | 1115196 A2 | 7/2001 |
| JP | H1198891 A | 4/1999 |
| JP | 2000037098 A | 2/2000 |
| JP | 2004056839 A | 2/2004 |
| JP | 4657215 | 3/2011 |

OTHER PUBLICATIONS

China Application No. 201410089156.1 First Office Action and Search Report dated Dec. 30, 2015, 9 pages.

CN Patent Application No. 201410092806.8 First Office Action and Search Report issued Feb. 2, 2016, 9 pages.

China Patent Application No. 201410145809.3 First Office Action and Search Report issued Dec. 31, 2015, 10 pages.

* cited by examiner

US 9,461,574 B2

MOTOR CONTROL SYSTEM FOR DETERMINING A REFERENCE D-AXIS CURRENT AND A Q-AXIS CURRENT

BACKGROUND OF THE INVENTION

The present invention relates to a control system for a motor, and more particularly to a control system for a motor that determines a reference d-axis current and a reference q-axis current.

The output torque of an interior permanent magnet synchronous motor (IPMSM) may be determined by a voltage command and a phase advance angle. A specific output torque of the IPMSM is determined by first selecting a specific quadrature axis (also referred to as the q-axis) reference current and a direct axis (also referred to as the d-axis) reference current, and then determining the voltage command and the phase advance angle based on the selected quadrature axis reference current and the direct axis reference current.

SUMMARY OF THE INVENTION

In one embodiment, a motor control system for determining a reference d-axis current and a reference q-axis current is provided. The motor control system includes a motor having measured motor speed, a DC power source and DC input lines, and a current command controller. The DC power source generates a bridge voltage across the DC input lines. The current command controller is in communication with the motor and the DC input lines. The current command controller is configured to monitor the bridge voltage and a torque reference command. The current command controller is configured to calculate the reference q-axis current based on a torque reference command. The current command controller is configured to calculate the reference d-axis current based on a magnitude of the reference q-axis current.

In another embodiment, a method for determining a reference d-axis current and a reference q-axis current is provided. The method includes monitoring a bridge voltage and a torque reference command sent to a current command controller. The method also includes calculating the reference q-axis current based on the torque reference command. The method also includes calculating the reference d-axis current based on a first region of operation if a magnitude of the reference q-axis current is less than or equal to a predetermined reference q-axis current value, and if a magnitude of a voltage command value is less than the bridge voltage.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
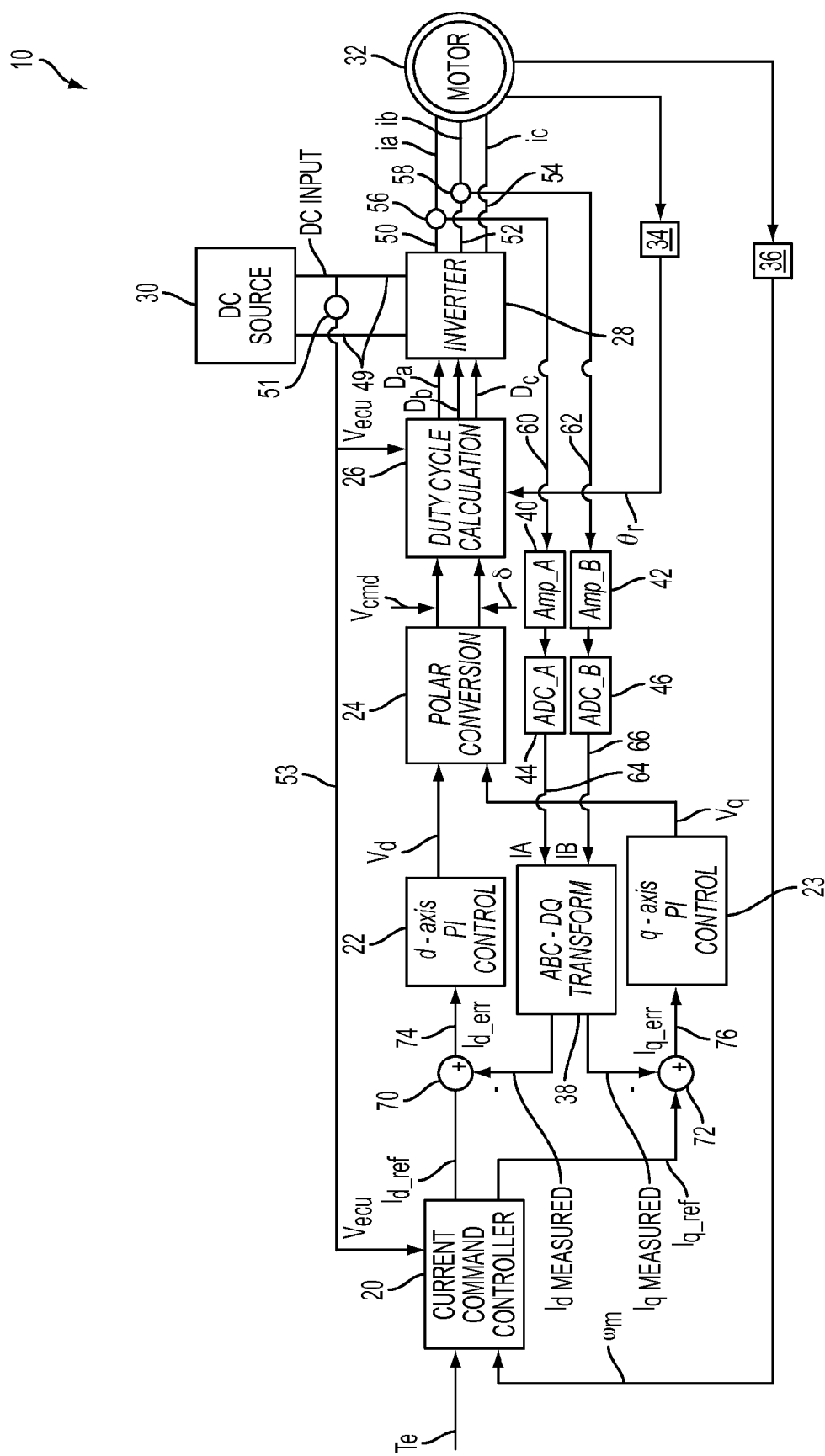
FIG. 1 is a block diagram of a motor control system in accordance with an exemplary embodiment of the invention.

Referring now to the Figures, where the invention will be described with reference to specific embodiments, without limiting same, FIG. 1 is an exemplary block diagram of a motor control system 10. The motor control system 10 includes a current command controller 20, a d-axis proportional plus integral gain (PI) controller 22, a q-axis PI controller 23, a polar conversion controller 24, a pulse width modulation (PWM) inverter controller 26, an inverter 28, a DC power source 30, a motor 32, a position sensor 34, a speed sensor 36, a transform controller 38, an a-axis current amplifier 40, a b-axis current amplifier 42, an a-axis analog to digital converter (ADC) 44, and a b-axis ADC 46. In one embodiment, the motor 32 may be an interior permanent magnet synchronous motor (IPMSM), however it is to be understood that any type of electric motor that is controlled using phase current may be used as well.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the current command controller 20 and the PWM inverter controller 26. In the exemplary embodiment as shown, the inverter 26 transmits three alternating current (AC) phase currents to the motor 32 (e.g., $i_a$, $i_b$, and $i_c$) by line 50, line 52, and line 54 for operation and control of the motor 32.

For feedback control purposes, the phase currents $i_a$ and $i_b$ transmitted to the motor 32 by lines 50 and 52 may be detected to determine the instantaneous current flow to the motor 32. Specifically, a transducer 56 may be used to monitor the phase current $i_a$ on the line 50, and a transducer 58 may be used to monitor the phase current $i_b$ on the line 52. It should be noted that although transducer 56 and transducer 58 are illustrated, only one of the lines 50 or 52 may be monitored to measure either phase current $i_a$ or phase current $i_b$. A control signal 60 representing the measured phase current $i_a$ may be sent to the a-axis current amplifier 40 from the transducer 56, and a control signal 62 representing the measured phase current $i_b$ may be sent to the b-axis current amplifier 42 from the transducer 58. An augmented or amplified value of the phase current $i_a$ is then sent to the a-axis ADC 44 from the a-axis current amplifier 40, and an amplified value of the phase current $i_b$ 62 is sent to the b-axis ADC 46 from the b-axis current amplifier 42. The a-axis ADC 44 converts the amplified value of the phase current $i_a$ into a digital value 64. The digital value 64 represent the magnitude of the phase current $i_a$. The b-axis ADC 46 converts the amplified value of the phase current $i_b$ into a digital value 66. The digital value 66 represents the magnitude of the phase current $i_b$.

The transform controller 38 receives as input the digital value 64 from the ADC 44 and the digital value 66 from the ADC 46. In one embodiment, the transform controller 38 is a three-phase to two-phase transformation controller where measured values for the AC current (e.g., the digital value 64 representing the phase current $i_a$ and the digital value 66 representing the phase current $i_b$) are converted into equivalent measured DC current components, which are a measured d-axis current $I_{dMEASURED}$ and a measured q-axis current $I_{qMEASURED}$. The measured d-axis current $I_{dMEASURED}$ is sent to a subtractor 70 and the measured q-axis current $I_{qMEASURED}$ is sent to a subtractor 72.

The current command controller 20 receives as input a torque reference command $T_e$, an angular speed $\omega_m$, and the control signal 53 representing the bridge voltage $V_{ecu}$ from the transducer 51. The torque reference command $T_e$ represents a commanded torque value, and may be derived from another controller (not shown), or may correspond to a torque value generated by an operator. The angular speed $\omega_m$ is measured by the speed sensor 36. The speed sensor 36 may include, for example, an encoder and a speed calculation circuit for calculating the angular speed of a rotor (not shown) of the motor 32 based on a signal received by the encoder. The current command controller 20 calculates a reference d-axis current $I_{d\_REF}$ and a reference q-axis current $I_{q\_REF}$ based on the torque command $T_e$, the bridge voltage $V_{ecu}$, and the angular speed $\omega_m$, which is described below. The reference d-axis current $I_{d\_REF}$ is sent to the subtractor 70, and the reference q-axis current $I_{q\_REF}$ is sent to the subtractor 72.

The subtractor 70 receives the measured d-axis current $I_{dMEASURED}$ and the reference d-axis current $I_{d\_REF}$. The subtractor 70 determines a d-axis error signal 74 based on the measured d-axis current $I_{dMEASURED}$ and the reference d-axis current $I_{d\_REF}$. The d-axis error signal 74 represents the error between the measured d-axis current $I_{dMEASURED}$ and the reference d-axis current $I_{d\_REF}$. The subtractor 72 receives the measured q-axis current $I_{qMEASURED}$ and the reference q-axis current $I_{q\_REF}$. The subtractor 72 determines a q-axis error signal 76 based on the measured q-axis current $I_{qMEASURED}$ and the reference q-axis current $I_{q\_REF}$. The q-axis error signal 76 represents the error between the measured q-axis current $I_{qMEASURED}$ and the reference q-axis current $I_{q\_REF}$.

The d-axis PI controller 22 receives as input the d-axis error signal 74 from the subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the subtractor 72. The q-axis PI controller 23 calculates a q-axis voltage signal $V_Q$. The q-axis voltage signal $V_Q$ is based on a q-axis proportional gain $K_P$, and a q-axis integral gain $K_i$.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle δ. The PWM inverter controller 26 receives as inputs the voltage command $V_{cmd}$ and the phase advance angle δ from the polar conversion controller 24. The PWM inverter controller 26 also receives a rotor angle value $\theta_r$ measured by the motor position sensor 34. In one exemplary embodiment, the PWM inverter controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the motor 32.

Determining the reference d-axis current $I_{d\_REF}$ and the reference q-axis current $I_{q\_REF}$ by the current command controller 20 will now be described. The current command controller 20 determines the reference d-axis current $I_{d\_REF}$ and the reference q-axis current $I_{q\_REF}$ based on the torque reference command $T_e$, the bridge voltage V, and the angular speed $\omega_n$, periodically. Specifically, the current command controller 20 determines the reference d-axis current $I_{d\_REF}$ and the reference q-axis current $I_{q\_REF}$ according to either a first region of operation RI, a second region of operation RII, or a third region of operation RIII, which is described below.

The current command controller 20 first determines the reference q-axis current $I_{q\_REF}$. In one embodiment, the reference q-axis current $I_{q\_REF}$ is based on the torque command $T_e$, may be determined by Equation 1:

$$I_{q\_REF} = (2*Te)/(\sqrt{3}*Ke) \qquad \text{Equation 1}$$

where Ke is the motor constant. The current command controller 20 may then compare a magnitude of the reference q-axis current $I_{q\_REF}$ as calculated in Equation 1 with a predetermined reference q-axis current $I_{q\_REF\_MAX}$. The predetermined reference q-axis current $I_{q\_REF\_MAX}$ represents a q-axis current for producing a maximum torque output by the motor 32, and may be determined by Equation 2:

$$I_{q\_REF\_MAX} = I_{REF\_MAX}*\cos(\alpha_{MAX}) \qquad \text{Equation 2}$$

where $T_{REF\_MAX}$ represents a phase current required for producing the maximum torque output by the motor 32, and $\alpha_{MAX}$ represents a value between the d-axis and the q-axis current required to produce maximum torque output by the motor 32. If the magnitude of the reference q-axis current $I_{q\_REF}$ is less than or equal to the predetermined reference q-axis current $I_{q\_REF\_MAX}$, then the reference d-axis current $I_{d\_REF}$ is based on a smoothening function in the first region of operation RI, which is described below. However, if the magnitude of the reference q-axis current $I_{q\_REF}$ is greater than the predetermined reference q-axis current $I_{q\_REF\_MAX}$, then the d-axis current $I_{d\_REF}$ is determined by the second region of operation RII, and is either set to a reference d-axis maximum current $I_{d\_REF\_MAX}$ (which is described below), or is determined based on the smoothening function.

The smoothening function is used to determine the reference d-axis current $I_{d\_REF}$ for smoothing transitions between various torque-speed operating points of the motor 32. In one embodiment, the current command controller 20 may first calculate the reference d-axis current $I_{d\_REF}$ by the smoothening function using Equations 3 and 4:

$$I_{d\_REF} = K1*(abs(\omega_m) + k\_K2*abs(T_e) - k\_K3) \qquad \text{Equation 3}$$

$$K1 = ka2*(T_e)^2 + k\_a1*(T_e) + k\_a0 \qquad \text{Equation 4}$$

where k_a0, k_a1, k_a2, k_K1, and k_K2 are constants derived from parameters of the motor 32. Once the reference d-axis current $I_{d\_REF}$ is calculated, the reference d-axis current $I_{d\_REF}$ may be determined using the algorithm:

if $I_{d\_REF} < 0$, then $I_{d\_REF} = 0$ else if $I_{d\_REF} > I_{d\_REF\_MAX}$, then $I_{d\_REF} = I_{d\_REF\_MAX}$ where $I_{d\_REF\_MAX}$ is determined by Equation 5 as:

$$I_{d\_REF\_MAX} = I_{REF\_MAX}*\sin(\alpha_{MAX}) \qquad \text{Equation 5}$$

where if the reference d-axis current $I_{d\_REF}$ as determined by Equations 3-4 is less than zero, then the reference d-axis current $I_{d\_REF}$ is set to zero. However, if the reference d-axis current $I_{d\_REF}$ is greater than the reference d-axis maximum current $I_{d\_REF\_MAX}$, then the reference d-axis current $I_{d\_REF}$ is set to the reference d-axis maximum current $I_{d\_REF\_MAX}$ as determined by Equation 5.

In the first region of operation RI, the reference d-axis current $I_{d\_REF}$ is either the reference d-axis maximum current $I_{d\_REF\_MAX}$ as determined by the smoothening function, or is set to zero. Also, in the first region of operation RI, if the reference d-axis current $I_{d\_REF}$ is a non-zero value, then the current command controller 20 determines the reference q-axis current $I_{q\_REF}$ by Equation 6:

$$I_{q\_REF}=(T_e/(\mathrm{sqrt}(3)/2*Ke*I_{q\_REF\_MAX}+k\_P/2*3/2*I_{d\_REF\_MAX}*(L_q-L_d))) \quad \text{Equation 6}$$

where k_P is the number of poles of the motor 32, $L_q$ is the q-axis inductance, and $L_d$ is the d-axis inductance.

In the second region of operation RII, the reference d-axis current $I_{d\_REF}$ is either determined by Equation 7 below, or is determined by the smoothening function. Equation 7 determines the reference d-axis current $I_{d\_REF}$:

$$I_{d\_REF}=(T_e-\mathrm{sqrt}(3)/2*Ke*I_{q\_REF\_MAX})/(k\_P/2*3/2*I_{qREF\_MAX}*(L_q-L_d)) \quad \text{Equation 7}$$

Specifically, the current command controller 20 selects the greatest value between the reference d-axis current $I_{d\_REF}$ as determined by Equation 7 and the reference d-axis current $I_{d\_REF}$ as determined by the smoothening function, and sets the reference d-axis current $I_{d\_REF}$ to the greatest value. Also, in the second region of operation RII, the current command controller 20 determines the reference q-axis current $I_{q\_REF}$ by Equation 6 as described above.

The current command controller 20 determines the voltage command $V_{cmd}$. In one embodiment, the voltage command $V_{cmd}$ is determined by Equations 8-12:

$$V_{QFF}=R*I_{q\_REF}*\sqrt{3}*Ke*\omega_m-2*X_d*I_{d\_REF} \quad \text{Equation 8}$$

$$V_{DFF}=R*I_{d\_REF}+2*X_q*I_{q\_REF} \quad \text{Equation 9}$$

$$X_q=(k\_P/2)*\omega_m*I_q \quad \text{Equation 10}$$

$$X_d=(k\_P/2)*\omega_m*L_d \quad \text{Equation 11}$$

$$V_{cmd}=\sqrt{V_{QFF}^2+V_{DFF}^2} \quad \text{Equation 12}$$

where $V_{QFF}$ is the feed forward q-axis voltage, $V_{DFF}$ is the feed forward d-axis voltage, R is resistance per phase of the motor 32, $X_d$ is a d-axis reactance, and $X_q$ is a q-axis reactance.

Once the voltage command $V_{cmd}$ is determined, the current command controller 20 compares the magnitude of the voltage command $V_{cmd}$ with the bridge voltage $V_{ecu}$, and determines if the reference d-axis current $I_{d\_REF}$ and the reference q-axis current $I_{q\_REF}$ are determined by the third region of operation RIII instead of the first region of operation RI or the second region of operation RII. Specifically, referring to Table 1 below, if the magnitude of the voltage command $V_{cmd}$ is greater than or equal to the bridge voltage V, then the third region of operation RIII is selected.

According to Table 1, if the magnitude of the reference q-axis current $I_{q\_REF}$ is less than or equal to the predetermined reference q-axis current $I_{q\_REF\_MAX}$, and if the magnitude of the voltage command $V_{cmd}$ is less than the bridge voltage $V_{ecu}$, then the first region of operation RI is selected. If the magnitude of the reference q-axis current $I_{q\_REF}$ is greater than the predetermined reference q-axis current $i_{q\_REF\_MAX}$, and if the magnitude of the voltage command $V_{cmd}$ is less than the bridge voltage $V_{ecu}$, then the second region of operation RII is selected.

If the third region of operation RIII is selected, either the smoothening function as described above or the target voltage circle calculation may be used to determine the reference d-axis current $I_{d\_REF}$. Specifically, the current command controller 20 determines the reference d-axis current $I_{d\_REF}$ based on the target voltage circle approach by first determining Equations 13-17:

$$Z_{q\_sqr}=R^2+X_q^2 \quad \text{Equation 13}$$

$$Z_{d\_sqr}=R^2+X_d^2 \quad \text{Equation 14}$$

$$B_{Dax}=I_{q\_REF}*R*(X_q-X_d)-2*Ke\sqrt{3}*\omega_m*X_d \quad \text{Equation 15}$$

$$C_{Dax}=I_{q\_REF}^2*Z_{q\_sqr}+Ke\sqrt{3}*\omega_m*R*I_{qref}+(Ke/\sqrt{3}*\omega_m)^2-V_{ecu}^2/3 \quad \text{Equation 16}$$

$$S_{Dax}=B_{Dax}^2-4*Z_{d\_sqr}*C_{Dax} \quad \text{Equation 17}$$

where $Z_{q\_sqr}$ is a q-axis impedance of the motor 32 squared, $Z_{d\_sqr}$ is a d-axis impedance squared, $B_{Dax}$, $C_{Dax}$ and $S_{Dax}$ are variables based on the target voltage circle, $I_{q\_REF}$ is determined using Equation 1 above, and $V_{CMD}=V_{ecu}$. The reference d-axis current $I_{d\_REF}$ may then be determined by the following d-axis target voltage circle algorithm:

If $S_{Dax}>=0$, then $I_{d\_REF}=(-B_{Dax}-\sqrt{S_{Dax}})/(2*Z_{d\_sqr})$

Else $I_{d\_REF}(-B_{Dax})/(2*Z_{d\_sqr})$ where the reference d-axis current $I_{d\_REF}$ is calculated based on the variable $S_{Dax}$. The current command controller 20 then determines the greatest value between the reference d-axis current $I_{d\_REF}$ as determined by the smoothening function above and the reference d-axis current $I_{d\_REF}$ as determined by the target voltage circle approach, and sets the reference d-axis current $I_{d\_REF}$ to the greatest value.

TABLE 1

| Conditions | Region One RI $\mathrm{abs}(I_{q\_REF}) \leq I_{q\_REF\_MAX}$ and $\mathrm{abs}(V_{cmd}) < V_{ecu}$ | Region Two RII $\mathrm{abs}(I_{q\_REF}) > I_{q\_REF\_MAX}$ and $\mathrm{abs}(V_{cmd}) < V_{ecu}$ | Region Three RIII $\mathrm{abs}(V_{cmd}) \geq V_{ecu}$ |
|---|---|---|---|
| $I_{d\_REF}$ | $I_{d\_REF} = 0$ or $I_{d\_REF\_MAX}$ as determined by the smoothening function (whatever yields the greatest value) | $I_{d\_REF}$ is determined by the smoothening function or Equation 7 (whatever yields the greatest value) | $I_{d\_REF}$ is determined by a target voltage circle calculator or the smoothening function (whatever yields the greatest value) |
| $I_{q\_REF}$ | $I_{q\_REF}$ is determined by Equation 1 if $I_{d\_REF} = 0$, Equation 6 if $I_{d\_REF}$ is based on the smoothening function | $I_{q\_REF}$ is determined by Equation 6 | $I_{q\_REF}$ is determined by Equation 1 or Equation 6 (whatever yields the least value), or by the target voltage circle calculator, using the $I_{d\_REF}$ determined by the target voltage circle calculator |

After the reference d-axis current $I_{d\_REF}$ is determined (using either the smoothening function or the target voltage circle approach), the current command controller 20 re-calculates the reference q-axis current $I_{q\_REF}$ using Equation 6 above, where the d-axis current $I_{d\_REF}$ as determined by the target voltage circle is used for $I_{d\_REF\_MAX}$. The current command controller 20 then determines the smallest value between the reference q-axis current $I_{q\_REF}$ as determined by Equation 6 and the reference q-axis current $I_{q\_REF}$ as determined using Equation 1 as described above. The current command controller 20 then sets the reference q-axis current $I_{q\_REF}$ to the smallest value.

Once the reference d-axis current $I_{d\_REF}$ and the reference q-axis current $I_{q\_REF}$ are determined, the current command controller 20 re-calculates the voltage command $V_{cmd}$ using Equations 8-12 above. The current command controller 20 also determines a peak current $I_{PEAK\_CURRENT}$ according to Equation 18:

$$I_{PEAK\_CURRENT} = \sqrt{I_{q\_REF}^2 + I_{d\_REF}^2} \qquad \text{Equation 18}$$

Once the voltage command $V_{cmd}$ is re-calculated and the peak current $I_{PEAK\_CURRENT}$ is determined, the current command controller 20 determines if either the magnitude of the voltage command $V_{cmd}$ is greater than or equal to the bridge voltage $V_{ecu}$ ($V_{cmd} \geq V_{ecu}$), or if a maximum current value Max_Current is greater than the peak current $I_{PEAK\_CURRENT}$ (Max_Current>$I_{PEAK\_CURRENT}$). The variable Max_Current is a predetermined value stored in memory. If either condition (e.g., $V_{cmd} \geq V_{ecu}$ or Max_Current>$I_{PEAK\_CURRENT}$) is met, then the current command controller 20 may re-calculate the reference q-axis current $I_{q\_REF}$ using the target voltage circle approach, which is described below. However, if neither condition is met, then the current command controller 20 may re-calculate the feed forward q-axis voltage $V_{QFF}$ and the feed forward d-axis voltage $V_{DFF}$ according to Equations 8-9 above and save the feed forward q-axis voltage $V_{QFF}$ and the feed forward d-axis voltage $V_{DFF}$ in memory.

The current command controller 20 may re-calculate the reference q-axis current $I_{q\_REF}$ based on the target voltage circle approach as described in Equations 19-21, where:

$$B_{Qax} = I_{Q\_REF} * R * (X_q - X_d) + 2 * Ke\sqrt{3} * \omega_m * R \qquad \text{Equation 19}$$

$$C_{Qax} = I_{d\_REF}^2 * Z_{d\_sqr} - Ke\sqrt{3} * \omega_m * X_d * I_{dref} + (Ke/\sqrt{3} * \omega_m)^2 - V_{ecu}^2/3 \qquad \text{Equation 20}$$

$$S_{Qax} = B_{Qax}^2 - 4 * Z_{q\_sqr} * C_{Qax} \qquad \text{Equation 21}$$

where $I_{d\_REF}$ is determined using Equations 13-17 above, and $V_{cmd} = V_{ecu}$. The reference q-axis current $I_{q\_REF}$ may then be determined using the following q-axis target voltage circle algorithm:

If $S_{Qax} \geq 0$, then $I_{q\_REF} = (-B_{Qax} - \text{sqrt}(S_{Qax})) / (2 * Z_{q\_sqr})$ Else $I_{q\_REF} = (-B_{Qax}) / (2 * Z_{q\_sqr})$ Once the reference q-axis current $I_{q\_REF}$ is determined using the q-axis current voltage circle algorithm, the current command controller 20 may then re-calculate the feed forward q-axis voltage $V_{QFF}$ and the feed forward d-axis voltage $V_{DFF}$ according to Equations 6-7 above, and save the feed forward q-axis voltage $V_{QFF}$ and the feed forward d-axis voltage $V_{DFF}$ in memory.

Figure 2:
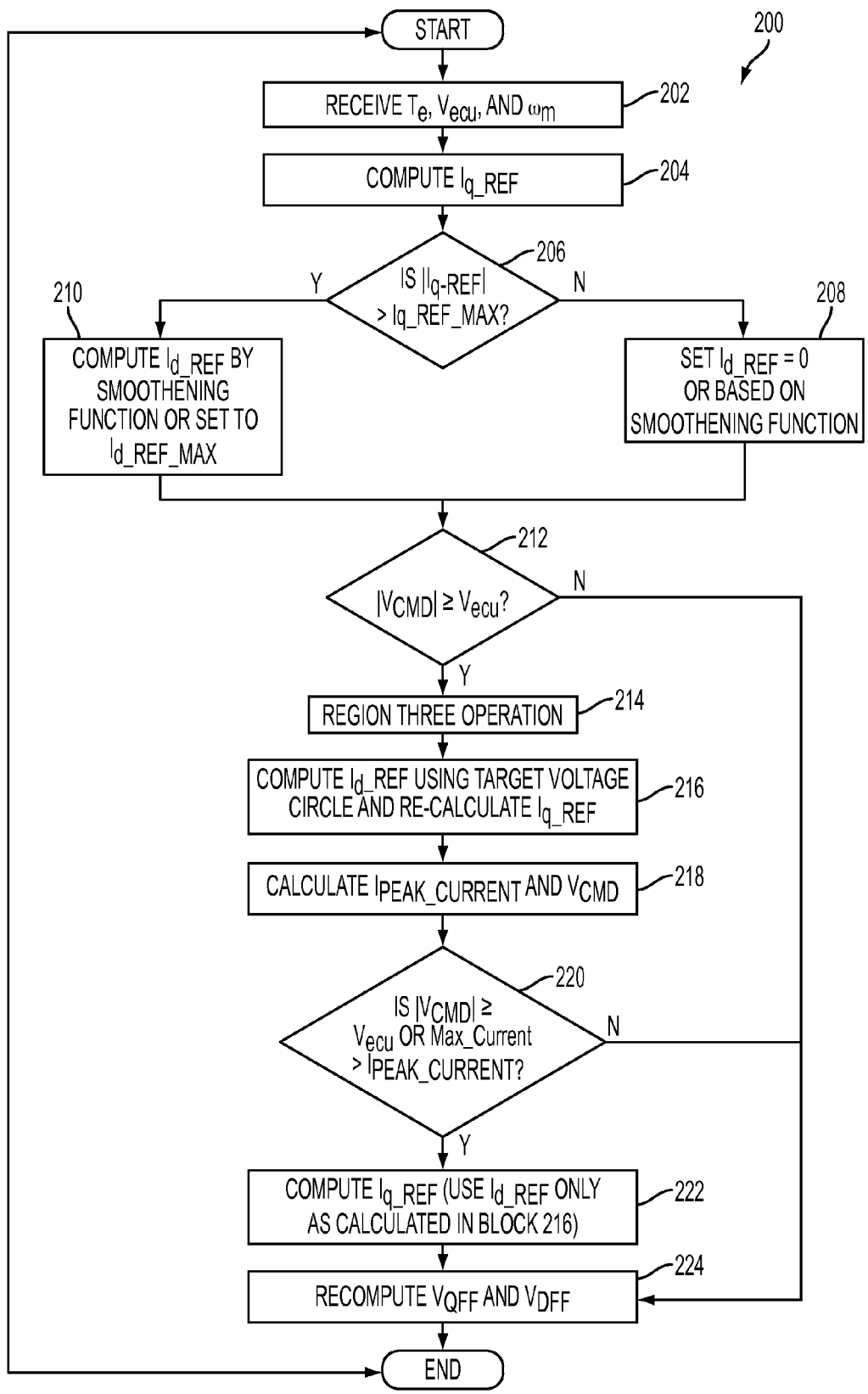
FIG. 2 is a process flow diagram for determining a reference d-axis current and a reference q-axis current, in accordance with another exemplary embodiment of the invention.

FIG. 2 is an exemplary process flow diagram illustrating a method 200 for determining the reference d-axis current $I_{d\_REF}$ and the reference q-axis current $I_{q\_REF}$. Referring now to both FIGS. 1-2, the method 200 may begin at block 202, where the current command controller 20 receives as input the torque reference command $T_e$, the angular speed $\omega_m$, and the bridge voltage $V_{ecu}$. Method 200 may then proceed to block 204.

In block 204, the current command controller 20 determines the reference q-axis current $I_{q\_REF}$. In one embodiment, the reference q-axis current $I_{q\_REF}$ may be determined by Equation 1 as described above. Method 200 may then proceed to block 206.

In block 206, the current command controller 20 determines if the magnitude of the reference q-axis current $I_{q\_REF}$ is greater than the predetermined reference q-axis current $I_{q\_REF\_MAX}$. If the answer is no, method 200 may then proceed to block 208, where the reference d-axis current $I_{d\_REF}$ is based on the smoothening function as described above. However, if the answer is yes, method 200 may then proceed to block 210, where the reference d-axis current $I_{d\_REF}$ is determined based on the smoothening function, or by Equation 7 above (whatever approach yields the greatest value). Method 200 may proceed to block 212 from both blocks 208 and 210.

In block 212, the current command controller 20 determines if the magnitude of the voltage command $V_{cmd}$ is greater than or equal to than the bridge voltage $V_{ecu}$. If the answer is yes, then method 200 may proceed to block 214. If the answer is no, then either the first region of operation RI or the second region of operation RII is selected, and method 200 may proceed to block 224.

In block 214, the third region of operation ME is selected. Method 200 may then proceed to block 216.

In block 216, the current command controller 20 determines the d-axis current $I_{d\_REF}$. Specifically, the current command controller 20 determines the greatest value between the reference d-axis current $I_{d\_REF}$ as determined by the smoothening function above (in either block 208 or 210) and the reference d-axis current $I_{d\_REF}$ as determined by the target voltage circle approach, and sets the reference d-axis current $I_{d\_REF}$ to the greatest value. Once the reference d-axis current $I_{d\_REF}$ is determined, the current command controller 20 re-calculates the reference q-axis current $I_{q\_REF}$ using Equation 6 above, and determines the smallest value between the reference q-axis current $I_{q\_REF}$ as determined by Equation 6 and the reference q-axis current $I_{q\_REF}$ as determined in block 204 above (using Equation 1). The current command controller 20 then sets the reference q-axis current $I_{q\_REF}$ to the smallest value. Method 200 may then proceed to block 218.

In block 218, the current command controller 20 re-calculates the voltage command $V_{cmd}$ using Equations 6-10 as described above. The current command controller 20 also determines the peak current $I_{PEAK\_CURRENT}$ according to Equation 16 as described above. Method 200 may then proceed to block 220.

In block 220, the current command controller 20 determines if either the magnitude of the voltage command $V_{cmd}$ is greater than or equal to the bridge voltage $V_{ecu}$ ($V_{cmd} \geq V_{ee}$), or if a maximum current value Max_Current is greater than the peak current $I_{PEAK\_CURRENT}$ (Max_Current>$I_{PEAK\_CURRENT}$). If either condition (e.g., $V_{cmd} \geq V_{ecu}$ or Max_Current>$I_{PEAK\_CURRENT}$) is met, then method 200 may proceed to block 222. However, if neither condition is met, then method 200 may then proceed to block 224.

In block 222, the current command controller 20 may re-calculate the reference q-axis current $I_{q\_REF}$. Specifically, the current command controller 20 determines the q-axis current $I_{q\_REF}$ using the target voltage circle approach as described in Equations 19-21. Method 200 may then proceed to block 224.

In block 224, the current command controller 20 may re-calculate the feed forward q-axis voltage $V_{QFF}$ and the feed forward d-axis voltage $V_{DFF}$ according to Equations 8-9 above, and save the feed forward q-axis voltage $V_{QFF}$ and the feed forward d-axis voltage $V_{DFF}$ in memory. Method 200 may then repeat, or terminate.

The current command controller 20 as described above determines the reference d-axis current $I_{d\_REF}$ and the reference q-axis current $I_{q\_REF}$ according to either the first region of operation RI, the second region of operation RII, or the third region of operation RIII based on based on the torque command $T_e$, the bridge voltage $V_{ecu}$, and the angular speed $\omega_m$. The reference d-axis current $I_{d\_REF}$ as determined by the current command controller 20 generally compensates for lost torque caused by sensor lag as well as any other limitations with the approach for controlling the motor 32.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor control system for determining a reference d-axis current and a reference q-axis current, comprising:
    a motor;
    a DC power source and DC input lines, the DC power source generating a bridge voltage across the DC input lines;
    a current command controller in communication with the motor and the DC input lines, the current command controller configured to:
    monitor the bridge voltage and a torque reference command;
    calculate the reference q-axis current based on the torque reference command; and
    calculate the reference d-axis current based on a magnitude of the reference q-axis current, the reference d-axis current is based on a first region of operation if the magnitude of the reference q-axis current is less than or equal to a predetermined reference q-axis current value, and if a magnitude of a voltage command value is less than the bridge voltage, the reference d-axis current is set to zero in the first region of operation if the reference d-axis current as determined by a smoothening function is less than zero, and a second region of operation is selected to calculate the reference d-axis current if the magnitude of the reference q-axis current is greater than the predetermined reference q-axis current value and the magnitude of the voltage command is less than the bridge voltage.

2. A motor control system for determining a reference d-axis current and a reference q-axis current, comprising:
    a motor;
    a DC power source and DC input lines, the DC power source generating a bridge voltage across the DC input lines;
    a current command controller in communication with the motor and the DC input lines, the current command controller configured to:
    monitor the bridge voltage and a torque reference command;
    calculate the reference q-axis current based on the torque reference command; and
    calculate the reference d-axis current based on a magnitude of the reference q-axis current, the reference d-axis current is based on a first region of operation if the magnitude of the reference q-axis current is less than or equal to a predetermined reference q-axis current value, and if a magnitude of a voltage command value is less than the bridge voltage, the reference d-axis current is set to a predetermined reference d-axis value in the first region of operation if the reference d-axis current as determined by a smoothening function is greater than the predetermined reference d-axis value, and a second region of operation is selected to calculate the reference d-axis current if the magnitude of the reference q-axis current is greater than the predetermined reference q-axis current value and the magnitude of the voltage command is less than the bridge voltage.

3. The motor control system of claim 2, wherein a smoothening function determines the reference d-axis current by:

$$I_{d\_REF}=K1*(abs(\omega_m)+k\_K2*abs(T_e)-k\_K3); \text{ and}$$

$$K1=k\_a2*(T_e)^2+k\_a1*(T_e)+k\_a0$$

wherein k_a0, k_a1, k_a2, k_K1, and k_K2 are constants derived from parameters of the motor, $I_{d\_REF}$ is the reference d-axis current, and $\omega_m$ is a measured motor speed.

4. The motor control system of claim 2, wherein the current command controller determines a second reference d-axis current in the second region of operation by:

$$I_{d\_REF}=(T_e-\text{sqrt}(3)/2*Ke*I_{q\_REF\_MAX})/(k\_P/2*3/2*I_{q\_REF\_MAX}*(L_q-L_d))$$

where $I_{d\_REF}$ is the second reference d-axis current value, $T_e$ is the torque reference command, Ke is a constant, $I_{q\_REF\_MAX}$ is the predetermined reference q-axis current value, k_P is the number of poles of the motor, $L_q$ is a q-axis inductance of the motor, and $L_d$ is a d-axis inductance of the motor.

5. The motor control system of claim 4, wherein if the second reference d-axis current is greater than the reference d-axis current determined by the smoothening function, then the d-axis current is set to the second reference d-axis current.

6. The motor control system of claim 2, wherein the reference d-axis current is determined based on a third region of operation if a voltage command is greater than or equal to the bridge voltage.

7. The motor control system of claim 6, wherein the current command controller determines a target voltage circle reference d-axis current based on a target voltage circle calculator in the third region of operation.

8. The motor control system of claim 7, wherein if the target voltage circle reference d-axis current is greater than the reference d-axis current determined by a smoothening function, then the d-axis current is set to the target voltage circle reference d-axis current.

9. The motor control system of claim 8, wherein current command controller re-calculates the voltage command and calculates a peak current based on the d-axis current being determined in the third region of operation.

10. The motor control system of claim 9, wherein current command controller re-calculates the q-axis current if the voltage command is greater than or equal to the bridge voltage, or if a current value is greater than the peak current.

11. A method of determining a reference d-axis current and a reference q-axis current of a motor, comprising:
monitoring a bridge voltage and a torque reference command by a current command controller;
calculating the reference q-axis current based on the torque reference command;
calculating the reference d-axis current based on a first region of operation if a magnitude of the reference q-axis current is less than or equal to a predetermined reference q-axis current value, and if a magnitude of a voltage command value is less than the bridge voltage;
setting the reference d-axis current to a predetermined reference d-axis value in the first region of operation if the reference d-axis current as determined by a smoothening function is greater than the predetermined reference d-axis value; and
calculating the reference d-axis current based on a second region of operation if the magnitude of the reference q-axis current is greater than the predetermined reference q-axis current value and the magnitude of the voltage command is less than the bridge voltage.

12. The method of claim 11, further comprising setting the reference d-axis current to zero in the first region of operation if the reference d-axis current as determined by a smoothening function is less than zero.

13. The method of claim 11, wherein a smoothening function determines the reference d-axis current by:

$$I_{d\_REF}=K1*(abs(\omega_m)+k\_K2*abs(T_e)-k\_K3); \text{ and}$$

$$K1=k\_a2*(T_e)^2+k\_a1*(T_e)+k\_a0$$

wherein k_a0, k_a1, k_a2, k_K1, and k_K2 are constants derived from parameters of the motor, $I_{d\_REF}$ is the reference d-axis current, and $\omega_m$ is a motor speed.

14. The method of claim 11, wherein the current command controller determines a second reference d-axis current in the second region of operation by:

$$I_{d\_REF}=(T_e-\text{sqrt}(3)/2*Ke*I_{q\_REF\_MAX})/(k\_P/2*3/2*I_{q\_REF\_MAX}*(L_q-L_d))$$

where $I_{d\_REF}$ is the second reference d-axis current value, $T_e$ is the torque reference command, Ke is a constant, $I_{q\_REF\_MAX}$ is the predetermined reference q-axis current value, k_P is the number of poles of the motor, $L_q$ is a q-axis inductance of the motor, and $L_d$ is a d-axis inductance of the motor.

15. The method of claim 14, wherein if the second reference d-axis current is greater than the reference d-axis current determined by the smoothening function, then the d-axis current is set to the second reference d-axis current.

16. The method of claim 11, wherein the reference d-axis current is determined based on a third region of operation if a voltage command is greater than or equal to the bridge voltage.

17. The method of claim 16, wherein the current command controller determines a target voltage circle reference d-axis current based on a target voltage circle calculator in the third region of operation.

18. The method of claim 17, wherein if the target voltage circle reference d-axis current is greater than the reference d-axis current determined by a smoothening function, then the d-axis current is set to the target voltage circle reference d-axis current.

19. The method of claim 18, wherein the current command controller re-calculates the voltage command and calculates a peak current based on the d-axis current being determined in the third region of operation.

20. The method of claim 19, wherein the current command controller re-calculates the q-axis current if the voltage command is greater than or equal to the bridge voltage, or if a current value is greater than the peak current.

* * * * *